United States Patent
Son

(10) Patent No.: US 6,317,233 B1
(45) Date of Patent: Nov. 13, 2001

(54) OPTICAL POWER EQUALIZER IN WDM OPTICAL COMMUNICATION SYSTEM AND VARIABLE ATTENUATOR FOR USE THEREIN

(75) Inventor: Yung-Sung Son, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/260,091

(22) Filed: Mar. 2, 1999

(30) Foreign Application Priority Data

Mar. 4, 1998 (KR) ..................................... 98-7104
Mar. 4, 1998 (KR) ..................................... 98-7105

(51) Int. Cl.[7] .......................... H04B 10/00; H04B 10/08; H04B 10/12
(52) U.S. Cl. ......................... 359/124; 359/110; 385/140
(58) Field of Search .................... 359/110, 124, 359/127, 577–590, 140; 385/140, 28, 30

(56) References Cited

U.S. PATENT DOCUMENTS

| | | | | |
|---|---|---|---|---|
| 5,135,295 | * | 8/1992 | Jen | 385/13 |
| 5,799,116 | * | 8/1998 | Yamamoto | 385/2 |
| 5,857,039 | * | 1/1999 | Bose | 385/14 |
| 5,892,857 | * | 4/1999 | McCallion | 385/1 |
| 5,966,493 | * | 10/1999 | Wagoner | 385/140 |
| 6,026,205 | * | 2/2000 | McCallion | 385/30 |
| 6,144,485 | * | 11/2000 | Sugaya | 359/337 |

* cited by examiner

Primary Examiner—Leslie Pascal
Assistant Examiner—Agustin Bello
(74) Attorney, Agent, or Firm—Fleshner & Kim, LLP

(57) ABSTRACT

Optical power equalizer in a WDM optical communication system which can tune an optical power down to a desired extent and a variable optical attenuator for use therein, optical power equalizer including a variable optical attenuator for reducing a power of an optical signal to a given level, an optical coupler for detecting a portion of signal proportional to an output of the variable optical attenuator, and an optical power monitor for receiving an output of the optical coupler and generating an electrical control signal for controlling an output of the variable optical attenuator; and the variable optical attenuator including two asymmetric optical waveguides adjacent to each other to form a directional coupler, and a thermooptic electrode for varying the asymmetry of the asymmetric optical waveguides, thereby attenuating an optical power of an optical communication system.

7 Claims, 13 Drawing Sheets

OPTICAL POWER EQUALIZER IN WDM OPTICAL COMMUNICATION SYSTEM AND VARIABLE ATTENUATOR FOR USE THEREIN

BACKGROUND OF THE INVENTION

1 Field of the Invention

The present invention relates to an optical power equalizer in a wavelength division multiplexing(WDM) optical communication system, and more particularly, to an optical power equalizer in a WDM optical communication system which can tune an optical power down to a desired extent and a variable optical attenuator for use therein.

2. Background of the Related Art

Having overcome a level in which a light is merely taken as a transmission medium in place of electricity, currently the optical communication has come to a level in which an optical signal is converted into an electrical signal at a final reception terminal after amplifying the optical signal for a longer distance transmission or processing the optical signal while maintaining a form of the optical signal without converting the optical signal into an electrical signal. And, recently, the wavelength division multiplexing technique is rapidly developed and spread for increasing a transmission capacity, in which an individual light source is provided for each of wavelengths in an optical signal, multiplexed before transmission, demultiplexed at a reception terminal, split into the individual wavelengths, thereby receiving the optical signal. And, sometimes, an optical amplifier is provided in the middle of the transmission for a long distance transmission. An optical communication network is sometimes provided with an add-drop function in which portions of the optical signal are allocated to required places and optical signals from the places are added thereto.

FIG. 1 schematically illustrates a related art WDM adddrop system, in which an optical signal transmitted through an optical amplifier 10 is demultiplexed through a demultiplexer 11 into individual wavelengths $\lambda_1, \lambda_2, \text{- - -}, \lambda_n$, add-drops are made for the individual wavelengths through optical switches 12, multiplexed through a multiplexer 14, amplified through an optical amplifier, and transmitted through one optical fiber. In this instance, as shown in FIG. 2A, the optical signal before the optical signal is multiplexed exhibits a non-uniform state between different wavelengths. Though there are many reasons which cause this non-uniform state, this non-uniform state typically comes from composite factors, such as differences of amplification gains between the wavelengths when the optical signal is amplified through the optical amplifier, differences in the wave splitting performances of the multiplexer 11 between the individual wavelengths, non-uniform switching characteristics of the optical switches 12, which cause the non-uniform state between the individual wavelengths in the optical signal at an input terminal of the multiplexer 14 so serious that a signal characteristic is deteriorated too much unable to make a long distance communication. Consequently, it is required to make powers of the optical signals uniform before the multiplexing, for which the optical attenuators 13 as shown in FIG. 1 are provided, owing to which outputs of the individual wavelengths are made uniform as shown in FIG. 2B. The optical attenuator, generally used currently with optical fibers handled manually, is not responsive to continuous signal changes since the system is fixed once adjusted initially. Therefore, a variable optical attenuator is required, which can be used continuously while monitoring an optical signal. Such a variable optical attenuator is disclosed, for example, in U.S. Pat. No. 4,644,145. Though the U.S. Pat No. 4,644,145 discloses variable optical attenuators used in optical waveguides for compensating variations of signals received at an optical receiver, with the object of the U.S. Pat. 4,644,145 lying on improvement of a receiver performance merely by making sizes of signals at a reception terminal uniform, it is very difficult to employ the optical attenuator in the WDM optical communication because the optical attenuator is one used before the optical communication system technology is matured, in which each of fast optical signals received in succession is attenuated at a fast speed for compensating time basis non-uniformity of the optical signals. That is, for modulation of the fast optical signals, though the variable optical attenuator in the U.S. Pat. No. 4,644,145 uses $LiNbO_3$ as a substrate for utilizing an electrooptical effect or GaAs, a semiconductor material, a device using $LiNbO_3$ as a substrate is expensive despite fast modulation is allowed, and not suitable for insertion in the middle of transmission for use, not in a few GHz range of fast modulation, but in the add-drop multiplexing system at a few kHz range of frequency because of a low coupling efficiency of the optical fiber and a device using GaAs, a semiconductor material, can not be put into practical use because of a further lower coupling efficiency and expensive material. And, the related art variable optical attenuator has a micrometer which uses an optical fiber for manual mechanical manipulation of the micrometer, or a micrometer fitted with a motor for electric control. However, the related art variable optical attenuator with a micrometer fitted with a motor, not only has many problems in actual application to the WDM optical communication system because it has a large power consumption, high driving voltage over 10V, relatively bulky, and a slow tuning speed of 50–1,400 msec, but also has a problem of high cost because the device is not suitable for mass production in view of the device structure.

SUMMARY OF THE INVENTION

Accordingly, the present invention is directed to an optical power equalizer in a WDM optical communication system that substantially obviates one or more of the problems due to limitations and disadvantages of the related art.

An object of the present invention is to provide an optical power equalizer in a WDM optical communication system, in which a tuning for maintaining an output of an optical signal in an optical communication system constant is allowed.

Other object of the present invention is to provide an optical power equalizer in a WDM optical communication system, which can provide a stable operation and has a low material cost and a simple fabrication process suitable for mass production; and a variable optical attenuator for use therein.

Another object of the present invention is to provide an optical power equalizer in a WDM optical communication system, which is operative with easy and has a low insertion loss; and a variable optical attenuator for use therein.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the optical power equalizer in a WDM optical communication system includes a variable optical attenuator for reducing a power of an optical signal to a given level, an optical coupler for detecting a portion of signal proportional to an output of the variable optical attenuator, and an optical power monitor for receiving an output of the optical coupler and generating an electrical control signal for controlling an output of the variable optical attenuator.

In another aspect of the present invention, there is provided a variable optical attenuator including two asymmetric optical waveguides adjacent to each other to form a directional coupler, and a thermooptic electrode for varying the asymmetry of the asymmetric optical waveguides, thereby attenuating an optical power of an optical communication system.

The optical power equalizer in a WDM optical communication system of the present invention not only allows to maintain a performance of an optical signal at an optimal state because the optical power can be always monitored and regulated at a level, but also is applicable to an optical attenuator for a WDM optical communication which requires no fast speed operation, which has stable operation and low cost and allows mass production owing to a simple fabrication process because a polymer thin film, which has a high thermooptic effect compared to silica used currently and is low cost, is used as an optical waveguide thin film in the optical attenuator.

And, in a case when two asymmetric optical waveguides are used in the optical attenuator, fine adjustment of the optical attenuator is available, and the optical attenuator has a low power consumption and driving voltage because the polymer thin film formed on a surface of the optical attenuator has a thermooptic effect 10 time greater than silica, reduces an insertion loss because the polymer is easy to adjust a refractive index by synthesizing and has a high coupling efficiency to an optical fiber, and allows a continuous use of the optical attenuator while monitoring the optical signal because an optical power reduction in the reference (channel) optical waveguide can be adjusted using a current flowing through the thermooptic electrode depending on which optical power of the reference optical waveguide is changed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
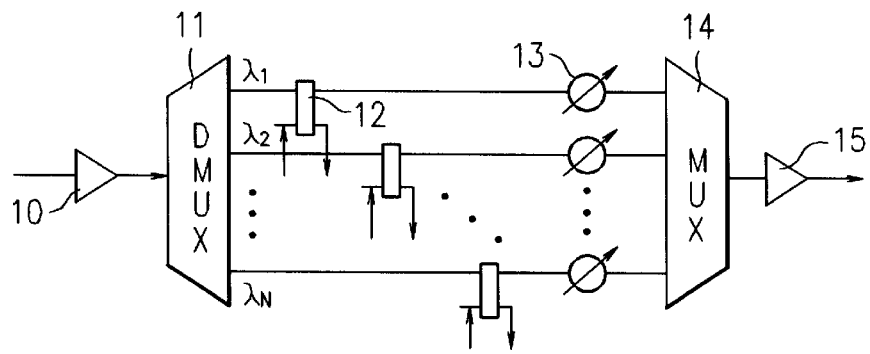
FIG. 1 schematically illustrates a related art WDM add-drop system.
Figure 2A:
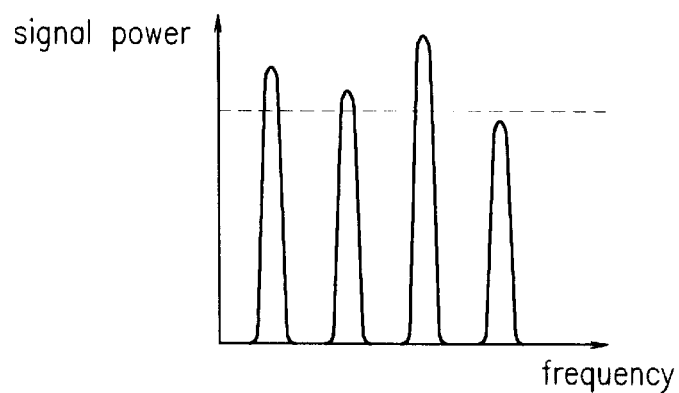
FIGS. 2A and 2B respectively illustrate powers of optical signals for wavelengths before being multiplexed and in a case an optical attenuator is used in a related art add-drop WDM device.
Figure 2B:
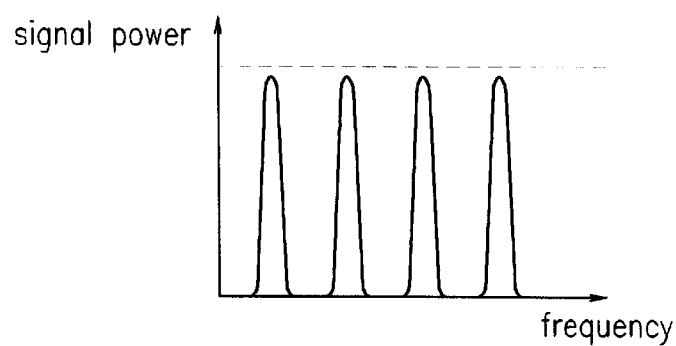
Figure 3:
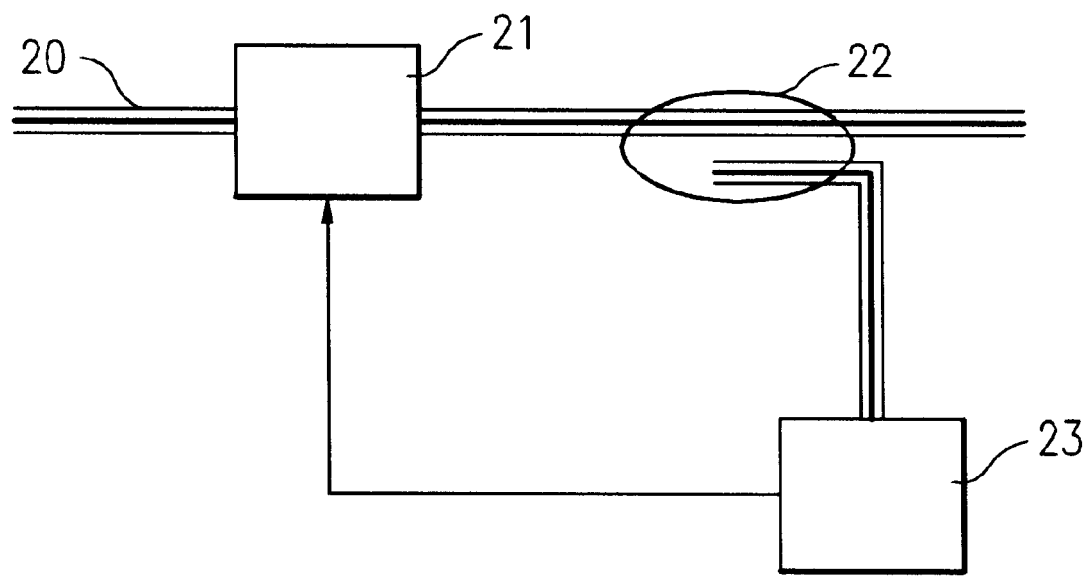
FIG. 3 illustrates a block diagram showing an optical power equalizer in accordance with a preferred embodiment of the present invention.

Reference will now be made in detail to the preferred embodiments of the present invention, examples of which are illustrated in the accompanying drawings. FIG. 3 illustrates a block diagram showing an optical power equalizer in accordance with a preferred embodiment of the present invention, and FIGS. 4~8 illustrate sections showing various embodiments of the variable optical attenuators in an optical power equalizer of the present invention.

Referring to FIG. 3, the optical power equalizer in accordance with a preferred embodiment of the present invention includes an optical waveguide 20, a variable optical attenuator 21 for attenuating a power of an optical signal to a given level, an optical coupler 22 for separating a portion of an output of the optical attenuator 21, and an optical power monitor 23 for receiving an output of the optical coupler 22 and generating an electrical control signal which is used as a signal for controlling an output level of the optical attenuator 21.

Various embodiments of the optical attenuator 21 are shown in FIGS. 4~8.

Figure 4:
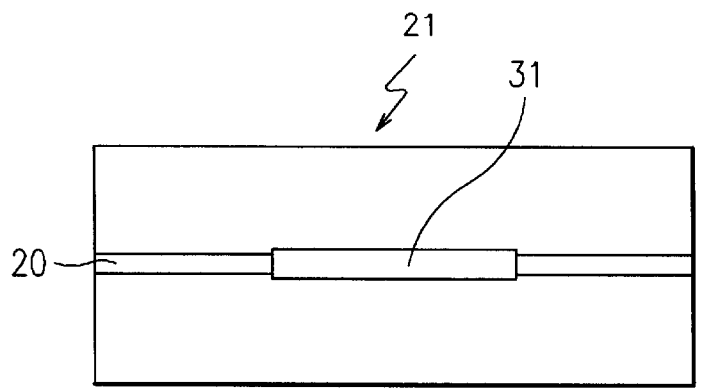
FIG. 4 illustrates a cut-off type optical attenuator for use in an optical power equalizer of the present invention.

FIG. 4 illustrates a cut-off type optical attenuator which is one embodiment of the optical attenuator 21 for use in an optical power equalizer of the present invention, including a single mode optical waveguide 20 having a substrate and polymer thin film formed on a surface of the substrate and a thermooptic electrode 31 on the optical waveguide 20. If there is no current flowing through the thermooptic electrode 31, a waveguide mode propagates without loss, and, if there is a current flowing through the thermooptic electrode 31, an output of the optical attenuator 21 is reduced because a heat generated in the thermooptic electrode 31 due to the current flow is transferred to the underlying optical waveguide 20, to raise a temperature of the optical waveguide 20 with a consequential reduction of a refractive index of the optical waveguide 20 due to a thermooptic effect of the polymer, that gradually converts the optical waveguide 20 into a cut off mode, with an increased propagation loss. Therefore, as explained, if a power of the optical signal transmitted through the optical waveguide 20 is greater than a desired value, to detect a greater power of the optical signal at the optical coupler 22, the power of the optical signal transmitted through the optical waveguide 20 in the optical attenuator 20 is reduced because a current control signal corresponding to the greater power of the optical signal is generated in the optical power monitor 23, and applied to the thermooptic electrode 31 in the optical attenuator. Thus, since the power of the optical attenuator 21 is controlled according to the current flowing through the thermooptic electrode 31, the optical power is always kept the same level.

Figure 5:
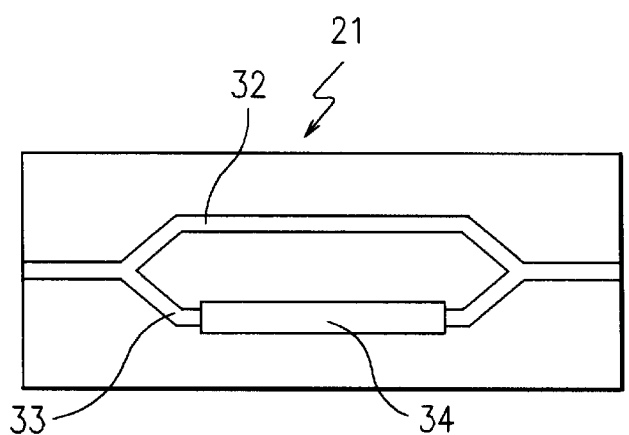
FIG. 5 illustrates a Mach-Zehnder interferometer type optical attenuator for use in an optical power equalizer of the present invention.

FIG. 5 schematically illustrates a section of a Mach-Zehnder interferometer type optical attenuator, another embodiment of the present invention, for use in an optical power equalizer of the present invention, including a first optical waveguide 32 and a second optical waveguide 33 connected in parallel and a thermooptic electrode 34 formed on a surface of the second optical waveguide 33. In the aforementioned optical attenuator 21, if there is no current flowing through the thermooptic electrode 34, output power is not charged as it is because a constructive interference is occurred when both optical waves are met since phases of optical waves passing through the optical waveguides 32 and 33 are the same. However, if there is a current flowing through the thermooptic electrode 34 in response to an electrical control signal applied from the optical power monitor 23, with a heat generated therein in proportion to the current, which causes a reduction of a refractive index of the optical waveguide 33 under the thermooptic electrode 34 coming from a thermooptic effect of the polymer formed on a surface of the optical waveguide 33, there is a difference of optical paths between the first and second optical waveguides 32 and 33. Accordingly, when the optical waves are met after the optical waves travel through the first and second optical waveguides 32 and 33, since a difference of the phases causes an destructive interference along with a reduction of the power, as explained before, the optical power of the optical attenuator 21 can be kept at the same level in response to the electrical control signal from the optical power monitor 23.

Figure 6:
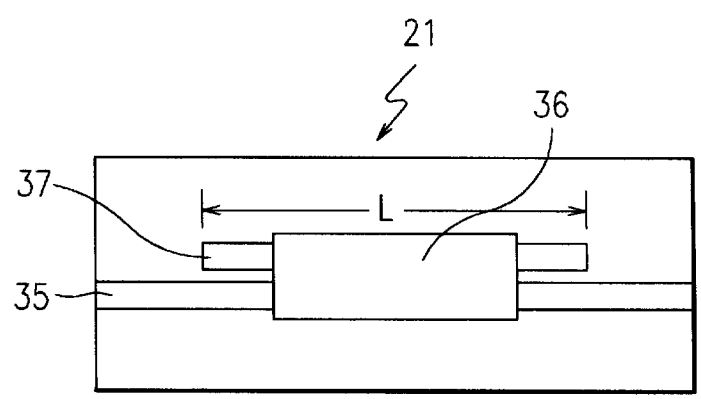
FIGS. 6~8 respectively illustrate an asymmetric directional coupler type optical attenuator for use in an optical power equalizer of the present invention.

FIG. 6 illustrates a directional coupler type optical attenuator, another embodiment of the optical attenuator of the present invention, for use in an optical power equalizer of the present invention, including one channel optical waveguide 35, another optical waveguide 37 fitted parallel to the channel optical waveguide 35, and a thermooptic electrode 36 formed to cover both the channel optical waveguide 35 and the optical waveguide 37. The optical attenuator 21 has refractive indices between the electrode and respective optical waveguides and a directional coupling coefficient, both set to make the power in a state no current is applied to the electrode 36 is the maximum. When a current is caused to flow to the thermooptic electrode 22, a refractive index of a portion under the thermooptic electrode 22 is reduced in correspondence to the current, which changes an optical coupling characteristic, allowing to obtain an optical attenuation. The optical attenuator 21 of this embodiment transmits an optical wave in a waveguide mode provided to the channel optical waveguide 35 when no current is applied to the thermooptic electrode 36. However, if a current is caused to flow to the thermooptic electrode 36 as the electric control signal is applied to the electrode 36 from the optical power monitor 23, refractive indices of the optical waveguides 35 and 37 and a refractive index between the optical waveguides 35 and 37 are reduced, with consequential changes of the directional coupling coefficient and a propagation constant of the waveguide mode, the directional coupling characteristic is changed. That is, if the power of the light from the optical attenuator 21 is great, the current detected from the optical coupler 22 is great in proportion to the power of the light. When an electric control signal corresponding to the current is applied to the optical attenuator 21 from the optical power monitor 23, because the refractive index is reduced due to a thermooptic effect of the polymer formed on a surface of the optical attenuator to reduce an output from the optical attenuator 21, eventually, a level of the optical signal from the optical attenuator 21 is kept constant regardless of the power of the optical signal traveling through the optical waveguide 20.

Figure 9A:
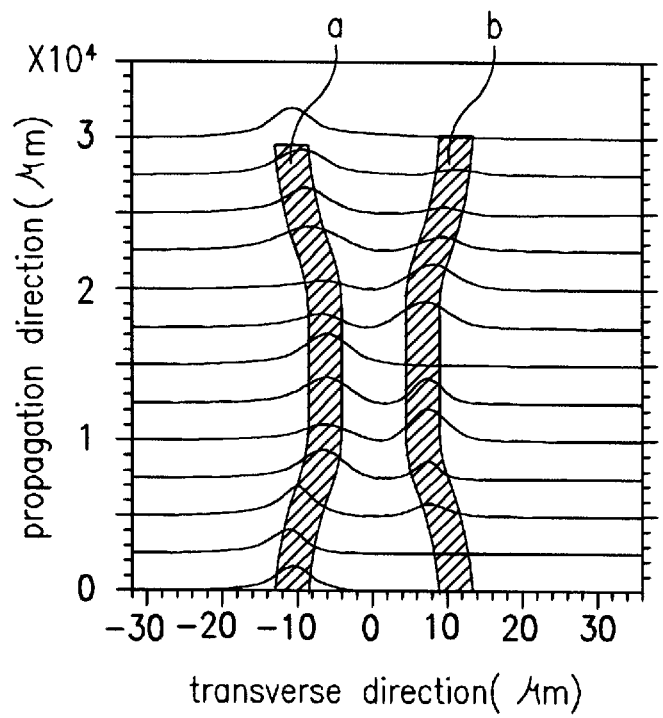
FIGS. 9A~9C each illustrates an example of a beam propagation and an optical attenuation characteristic of an optical attenuator having a directional coupler of two symmetric optical waveguides.
Figure 9B:
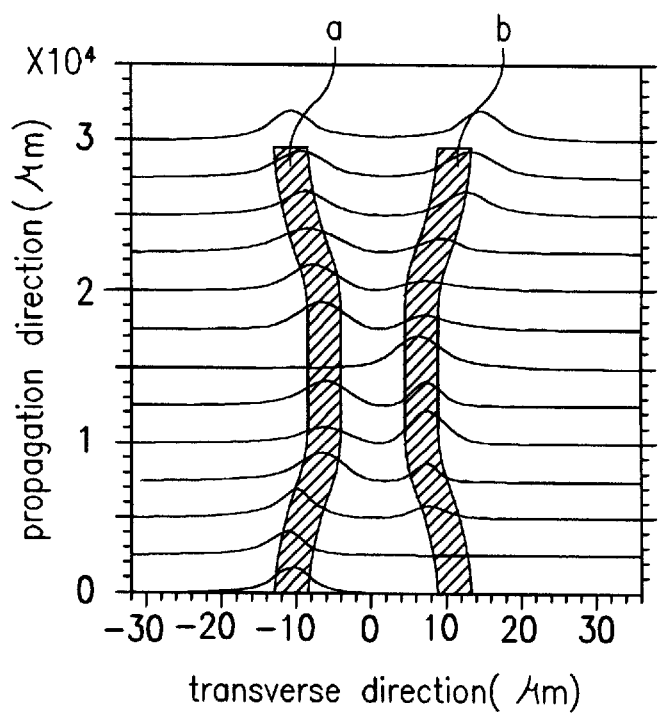
Figure 9C:
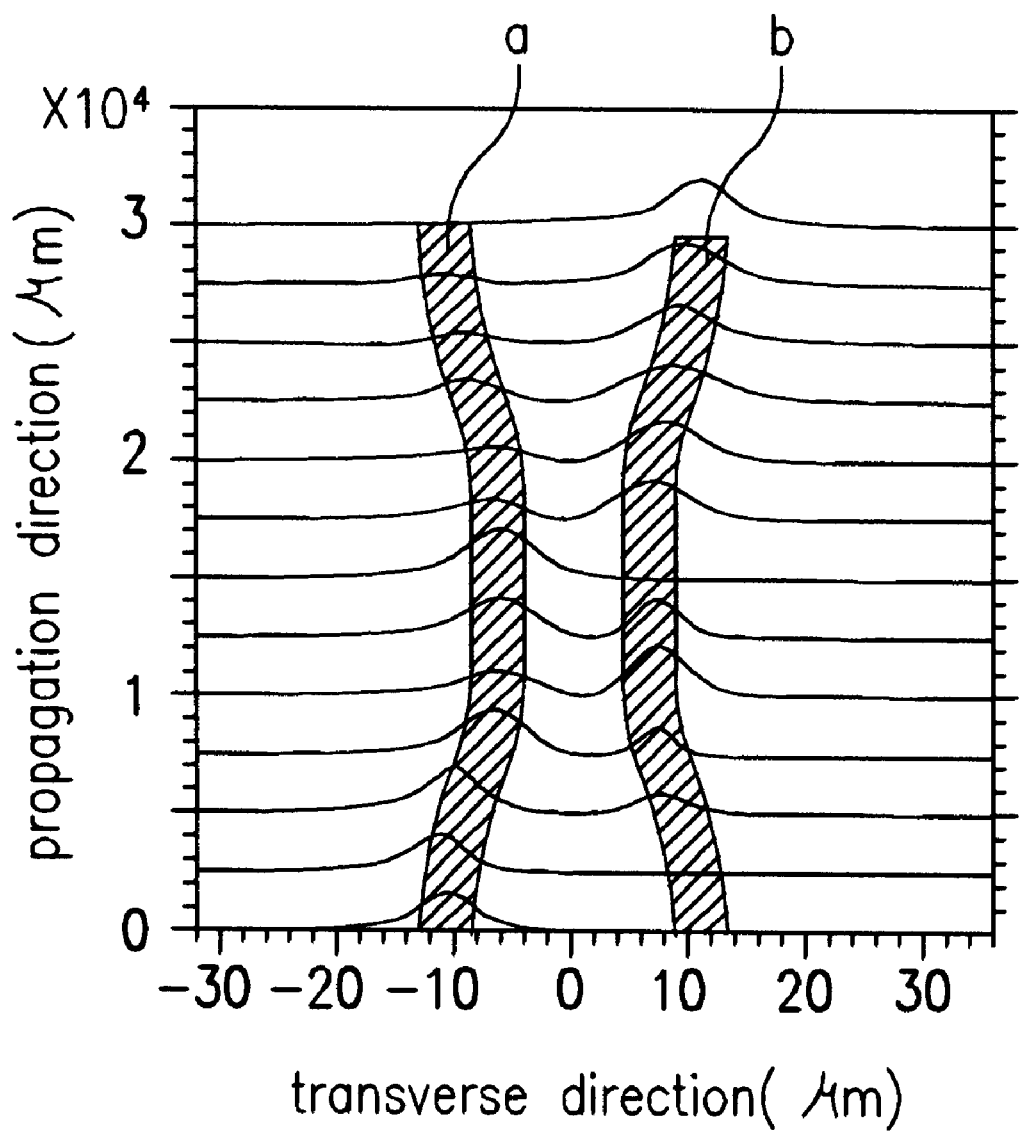
Figure 10A:
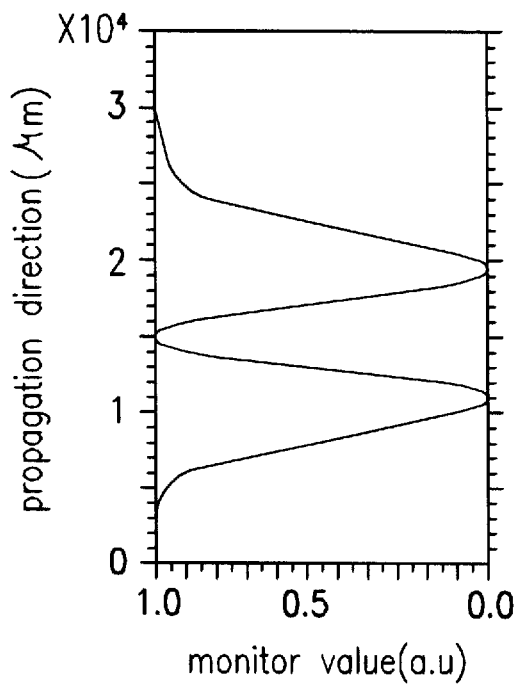
FIGS. 10A~10C illustrate graphs of the optical powers in FIGS. 9A~9C each shown with respect to a propagation direction.
Figure 10B:
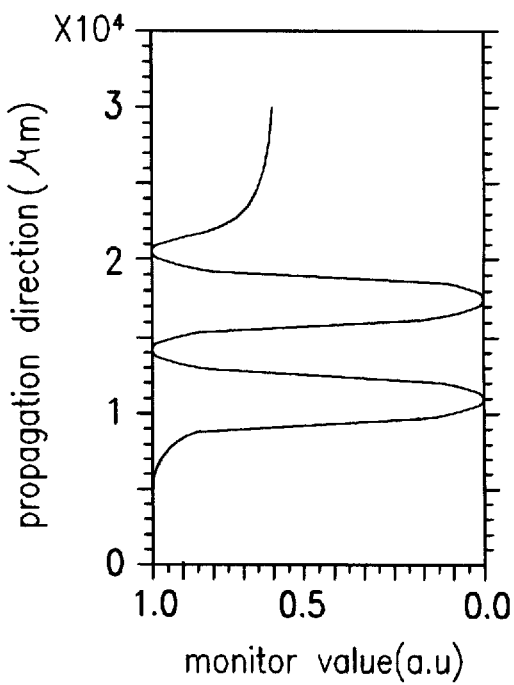
Figure 10C:
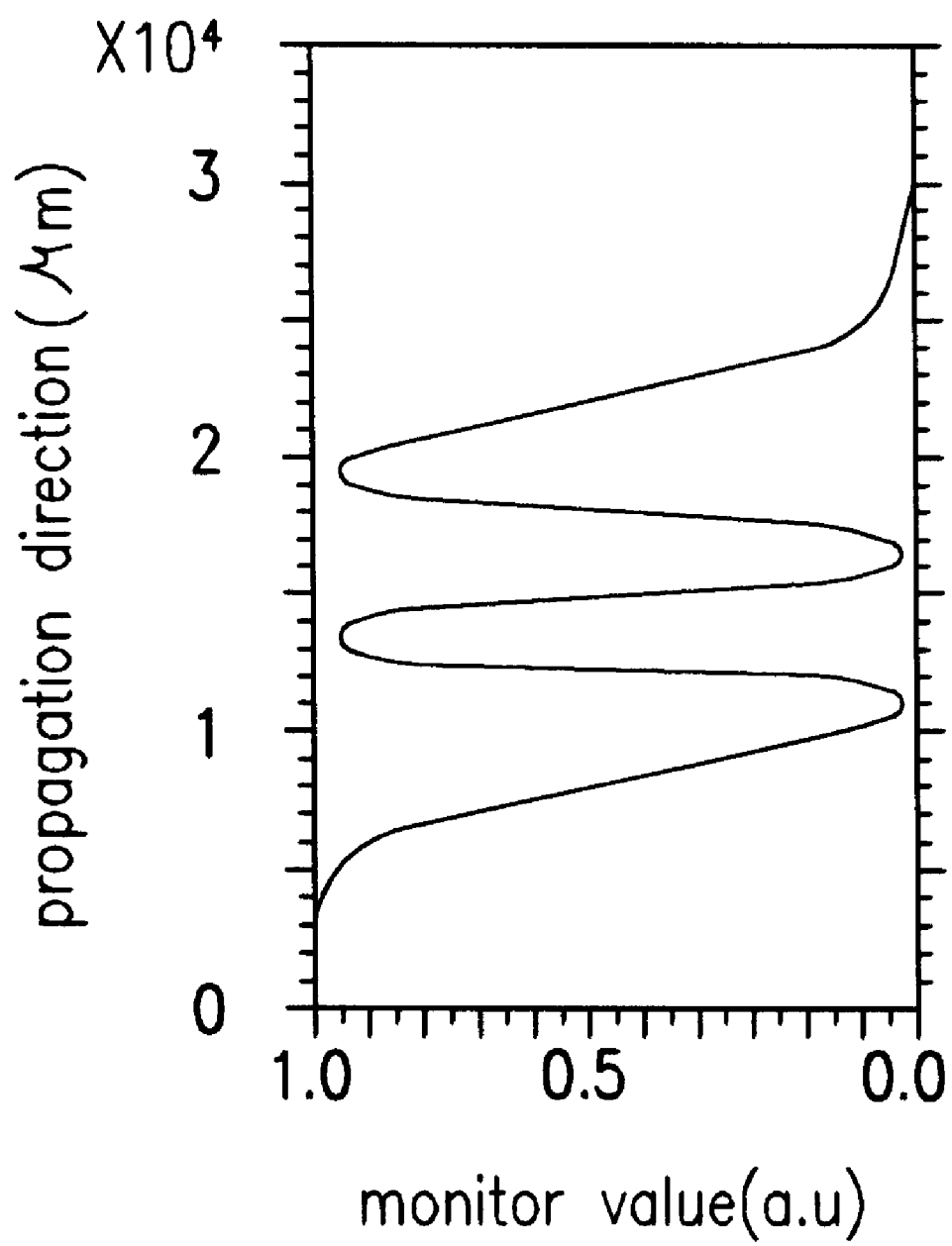
Figure 11A:
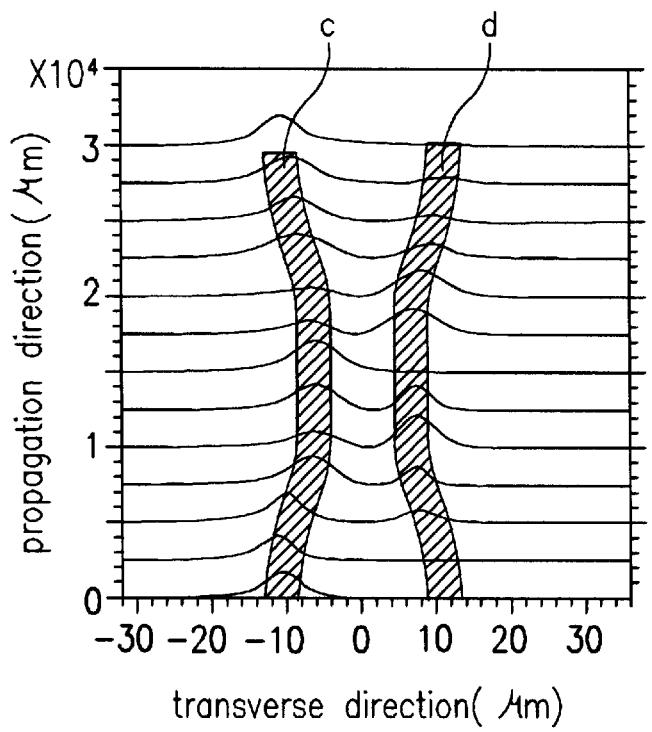
FIGS. 11A~11C each illustrates an example of a beam propagation and an optical attenuation characteristic of an optical attenuator having a directional coupler of two asymmetric optical waveguides; and, FIGS. 12A~12C illustrate graphs of the optical powers in FIGS. 11A~11C each shown with respect to a propagation direction.
Figure 11B:
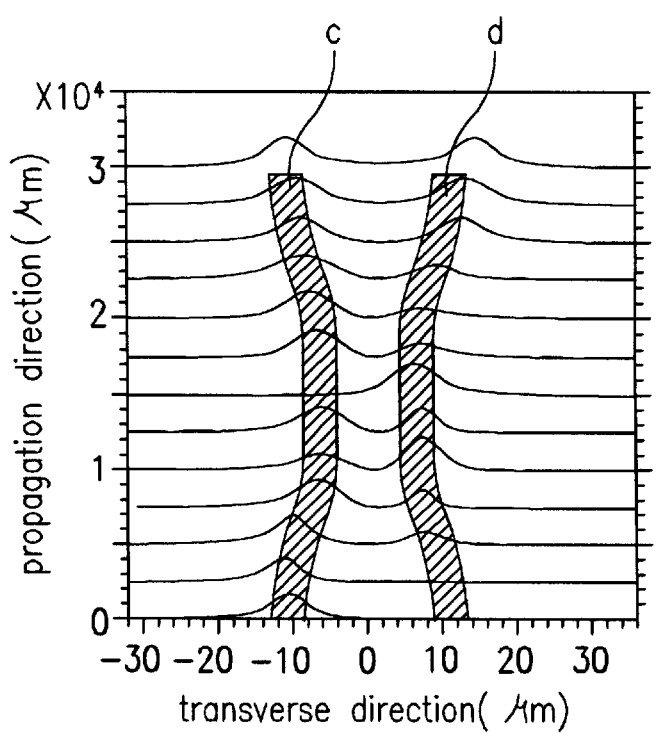
Figure 11C:
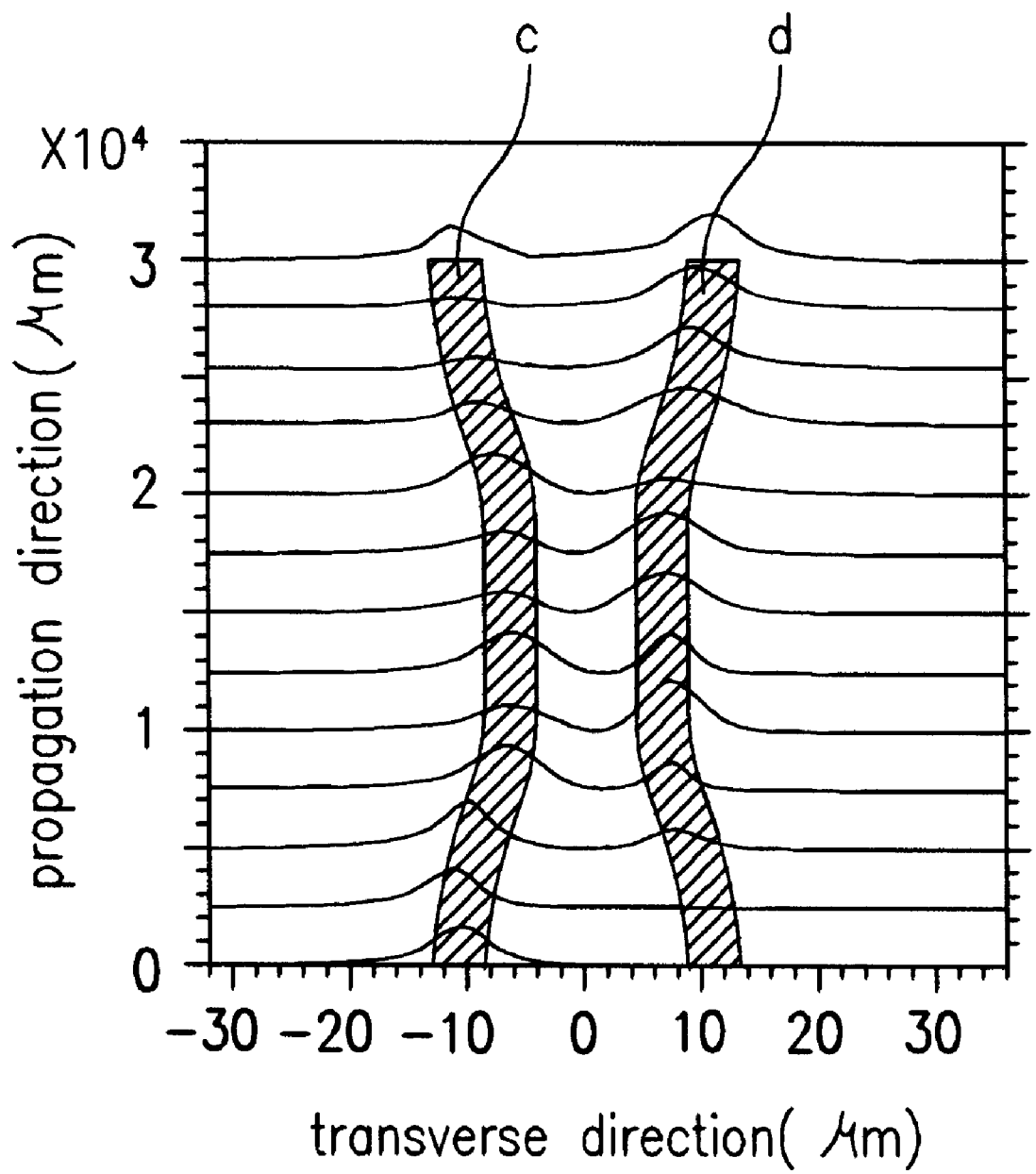
Figure 12A:
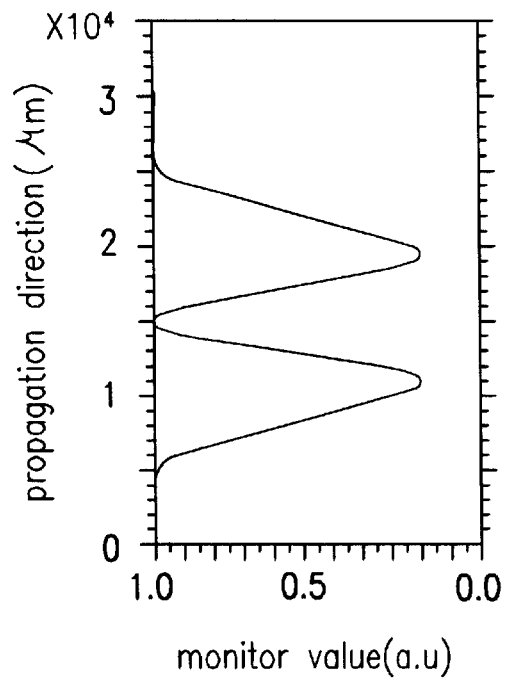
Figure 12B:
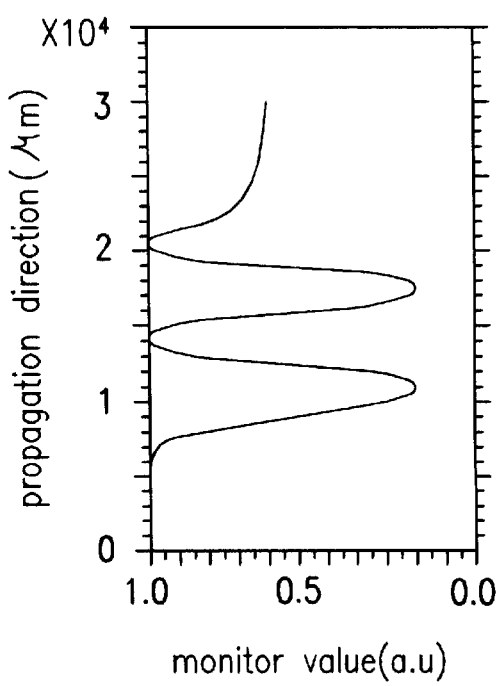
Figure 12C:
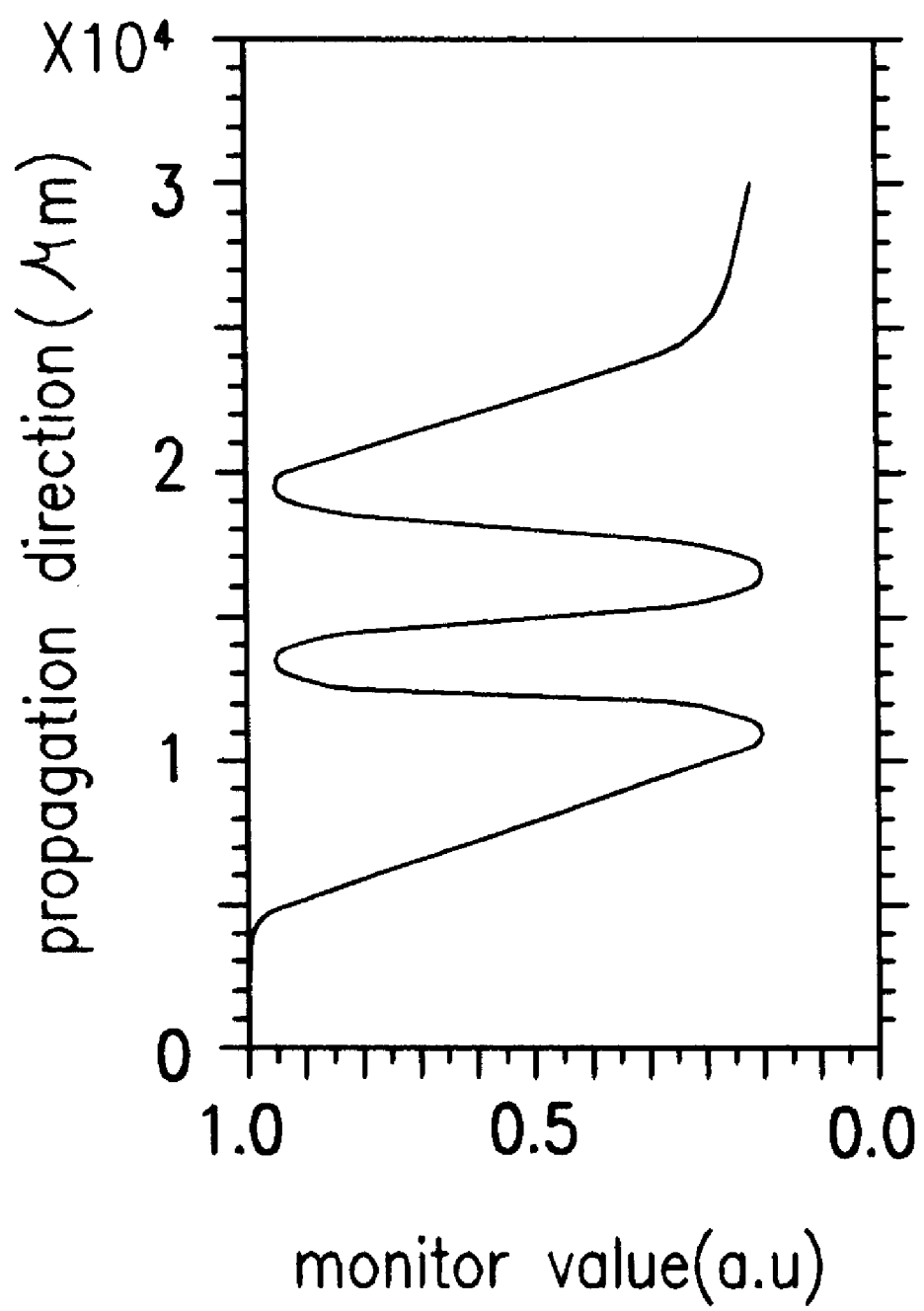

FIGS. 9A~9C each illustrates a beam propagation through a directional coupler of two symmetric optical waveguides 'a' and 'b' according to a current provided to a thermooptic electrode, FIGS. 10A~10C illustrate graphs of the optical powers in left side optical waveguides 'a' in FIGS. 9A~9C each shown with respect to a propagation direction obtained by simulation, FIGS. 11A~11C each illustrates a beam propagation through a directional coupler of two asymmetric optical waveguides 'c' and 'd' in an optical attenuator, and FIGS. 12A~12C illustrate graphs of the optical powers in left side optical waveguides 'c' in FIGS. 11A~11C each shown with respect to a propagation direction obtained by simulation. In all of the cases of the aforementioned drawings, input/output is made using the left side optical waveguide 'a' or 'c'. A last measurement in the propagation direction is the output, an output from the optical attenuator; FIG. 9A shows that the last output is 100%(a monitor value a.u=1.0), FIG. 9B shows that the last output is approx. 60%(a monitor value a.u=0.6), and FIG. 9C shows that the last output is 0%(a monitor value a.u=0), and FIGS. 11A, 11B, and 11C show that the last outputs are 100%, approx. 60%, and approx. 20%, respectively. Therefore, as shown in FIGS. 9A~9C, since 100% output at the maximum and 0% output at the minimum are obtainable in cases of symmetric directional couplers, though a long modulation length is obtainable, fine adjustment of power is difficult when a relatively identical thermooptic effect is used. However, as shown in FIGS. 11A~11C, since 100% output at the maximum and 20% output at the minimum are obtainable in cases of asymmetric directional couplers, since a modulation length is short, fine adjustment of power is easy. Accordingly, the optical attenuator of the present invention that employs asymmetric optical waveguides can make a fine adjustment of an optical attenuation with easy.

Figure 7A:
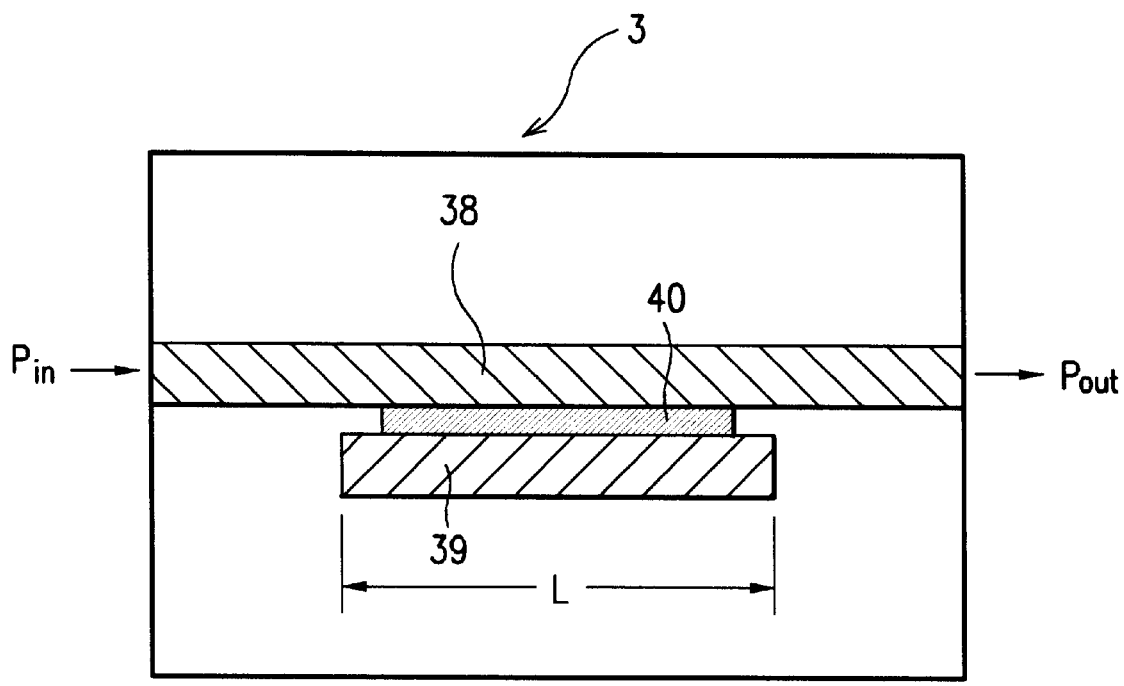
Figure 7B:
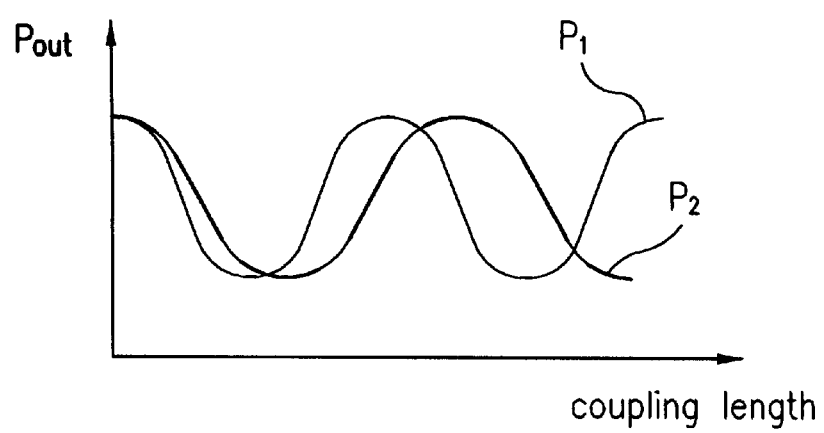

FIGS. 7A and 7B respectively illustrate another embodiment of directional coupler type optical attenuator and a graph showing an optical attenuation characteristic in terms of coupling length versus output Pout of the directional coupler type optical attenuator.

Referring to FIG. 7A, the optical attenuator 21 includes a directional coupler with a coupling length 'L' having a reference optical waveguide 38 and an asymmetric optical waveguide 39 disposed in parallel to the reference optical waveguide 38 with a propagation constant different from the reference optical waveguide 38 and a thermooptic electrode 40 formed between the optical waveguides 38 and 39. A width of the optical waveguide 39 in the directional coupler is made different from the reference optical waveguide 38, to make an effective refractive index of the optical waveguide 39 slightly different from the reference optical waveguide 38. Though the optical attenuator of this embodiment makes no optical attenuation if no current is applied to the thermooptic electrode 40, if a current is applied to the thermooptic electrode 40, the optical attenuator makes an optical attenuation down to a minimum power as a refractive index between the optical waveguides 38 and 39 is reduced due to a thermooptic effect of the polymer, which in turn reduces a power from the output terminal on the optical attenuator 40, that in turn increases the current to enhance the thermooptic effect of the polymer. A size of the minimum power is dependent on an extent of asymmetry of the initial optical waveguides 38 and 39 at which no current is applied to the thermooptic electrode 40. FIG. 7B illustrates an optical power $P_1$ when no current is applied to the thermooptic electrode 40 and an optical power $P_2$ when a current is applied to the thermooptic electrode 40 versus coupling length 'L'. In order to obtain an optical power with a required modulation depth, the coupling length should be adjusted, appropriately. The optical attenuator of this embodiment is suitable for making an exact adjustment of a small sized optical attenuation while a comparatively small optical attenuation is made.

Figure 8A:
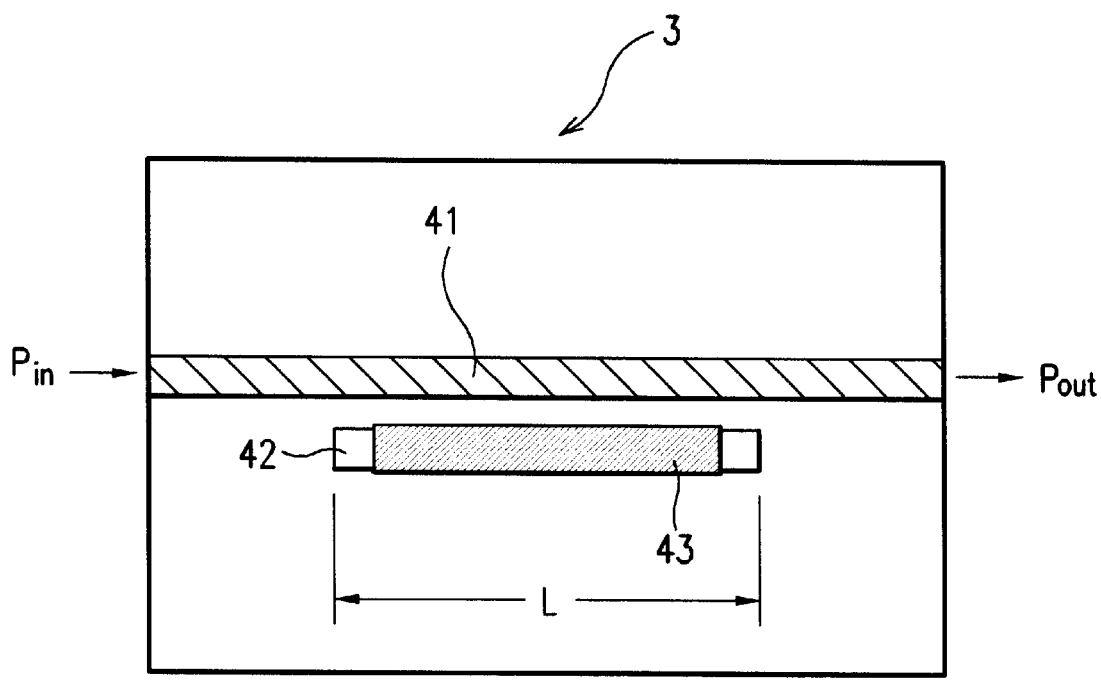
Figure 8B:
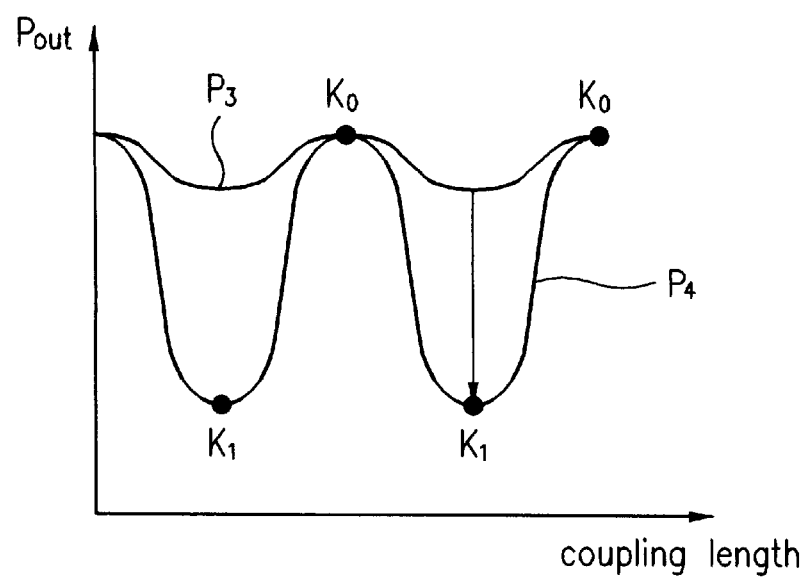

FIGS. 8A~8C respectively illustrate another embodiment of a directional coupler type optical attenuator and a graph showing an optical attenuation characteristic of the directional coupler type optical attenuator in terms of coupling length 'L' versus output Pout thereof.

Referring to FIG. 8A, the another embodiment optical attenuator includes a directional coupler having a reference optical waveguide 41 and an asymmetric optical waveguide 42 disposed parallel to the reference optical waveguide 41 with a propagation constant set different from the reference optical waveguide 41 and a thermooptic electrode 43 formed on the asymmetric optical waveguide 42. The optical attenuator has a coupling length corresponding to a length 'L' of the optical waveguide 42. FIG. 8B illustrates an optical power $P_3$ when no current is applied to the thermooptic electrode 43 and an optical power $P_4$ when a current is applied to the thermooptic electrode 43 versus coupling length 'L'. Though the aforementioned variable optical attenuator makes almost no optical attenuation when no current is applied to the thermooptic electrode 43, if a current is applied to the thermooptic electrode 43, the variable optical attenuator makes an optical attenuation down to a minimum power because the refractive index between the optical waveguides is reduced due to a thermooptic effect of the polymer, to reduce an output on an output terminal according to a coupling length 'L', which in turn increases the current, that in turn enhances the thermooptic effect of the polymer. Therefore, if the coupling length 'L' is selected appropriately, 100% power $K_0$ at the maximum and 20% $K_1$ at the minimum are obtainable, and a modulation depth, which is a variation of the optical attenuation, is dependent on an extent of asymmetry of the asymmetric optical waveguides and the coupling depth, i.e., a size of the minimum power can be set depending on the extent of asymmetry. As the extent of asymmetry becomes the greater, with a weaker optical coupling and a smaller optical attenuation, the minimum power becomes the greater, and vice versa. Thus, the extent of asymmetry of the asymmetric optical waveguides according to a coupling length adjusts an extent of optical attenuation. And, a size of the minimum power in this embodiment variable optical attenuator is dependent on the extent of asymmetry of the initial optical waveguides at which no current is applied to the thermooptic electrode 43. And, this embodiment variable optical attenuator is suitable for making a fine adjustment on a small sized optical attenuation while making a comparatively great optical attenuation.

It will be apparent to those skilled in the art that various modifications and variations can be made in the optical power equalizer in a WDM optical communication system and a variable optical attenuator for use therein of the present invention without departing from the spirit or scope of the invention. Thus, it is intended that the present invention cover the modifications and variations of this invention provided they come within the scope of the appended claims and their equivalents.

What is claimed is:

1. An optical power equalizer in a WDM (Wavelength Division Multiplexing) optical communication system comprising:

a variable optical attenuator having two asymmetric optical waveguides adjacent to each other to form a directional coupler, wherein each of the two asymmetric optical waveguides includes a polymer thin film, wherein thermooptic electrode is formed to cover all outer portions of the two asymmetric optical waveguides;

an optical coupler coupled to receive an output of the variable optical attenuator; and an optical power monitor coupled to monitor an output of the optical coupler and for generating an electrical control signal for controlling an output of the variable optical attenuator.

2. An optical power equalizer as claimed in claim 1, wherein the two asymmetric optical waveguides are coupled in parallel.

3. A variable optical attenuator for optical communication comprising:

two asymmetric optical waveguides adjacent to each other to form a directional coupler, wherein each of the two asymmetric optical waveguides includes a polymer thin film; and a thermooptic electrode for varying the asymmetry of the asymmetric optical waveguides, thereby attenuating an optical power of an optical communication system, wherein the thermooptic electrode is formed to cover all outer portions of the two asymmetric optical waveguides.

4. A variable optical attenuator as claimed in claim 3, wherein each of the two asymmetric optical waveguides includes a polymer thin film, and the thermooptic electrode is formed between the two asymmetric optical waveguides.

5. An optical power equalizer in a WDM (Wavelength Division Multiplexing) optical communication system comprising:

a variable optical attenuator having two asymmetric optical waveguides adjacent to each other to form a directional coupler, wherein each of the two asymmetric optical waveguides includes a polymer thin film, and wherein the thermooptic electrode is formed between the two asymmetric optical waveguides;

an optical coupler coupled to receive an output of the variable optical attenuator; and an optical power monitor coupled to monitor an output of the optical coupler and for generating an electrical control signal for controlling an output of the variable optical attenuator.

6. An optical power equalizer as claimed in claim 5, wherein the two asymmetric optical waveguides are coupled in parallel.

7. A variable optical attenuator for optical communication comprising:

two asymmetric optical waveguides adjacent to each other to form a directional coupler, wherein each of the two asymmetric optical waveguides includes a polymer thin film; and a thermooptic electrode for varying the asymmetry of the asymmetric optical waveguides, thereby attenuating an optical power of an optical communication system, wherein the thermooptic electrode is formed between the two asymmetric optical waveguides.

* * * * *